United States Patent
Chen et al.

(10) Patent No.: US 11,507,487 B2
(45) Date of Patent: Nov. 22, 2022

(54) CONTROL OF A COMPUTING SYSTEM TO PERFORM NETWORK FABRIC BENCHMARK MEASUREMENTS

(71) Applicant: VMware, Inc., Palo Alto, CA (US)

(72) Inventors: Chien-Chia Chen, Sunnyvale, CA (US); Dongdong Deng, Sunnyvale, CA (US); Jin Heo, Mountain View, CA (US); Shilpi Agarwal, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 859 days.

(21) Appl. No.: 15/710,743

(22) Filed: Sep. 20, 2017

(65) Prior Publication Data
US 2018/0089053 A1    Mar. 29, 2018

Related U.S. Application Data

(60) Provisional application No. 62/401,004, filed on Sep. 28, 2016.

(51) Int. Cl.
| | |
|---|---|
| *G06F 11/34* | (2006.01) |
| *H04L 49/50* | (2022.01) |
| *H04L 49/10* | (2022.01) |
| *G06F 9/455* | (2018.01) |
| *H04L 41/14* | (2022.01) |

(Continued)

(52) U.S. Cl.
CPC .......... *G06F 11/3428* (2013.01); *H04L 49/50* (2013.01); *G06F 9/45558* (2013.01); *H04L 41/12* (2013.01); *H04L 41/14* (2013.01); *H04L 41/145* (2013.01); *H04L 47/70* (2013.01); *H04L 49/10* (2013.01)

(58) Field of Classification Search
None
See application file for complete search history.

(56) References Cited

U.S. PATENT DOCUMENTS 5,161,116 A * 11/1992 Schneider .......... G06F 11/3414
702/186
6,763,380 B1 * 7/2004 Mayton .................. H04L 41/14
709/223

(Continued)

OTHER PUBLICATIONS

Albert Greenberg et al., "The Cost of a Cloud: Research Problems in Data Center Networks", ACM SIGCOMM Computer Communication Review, vol. 39, No. 1, Jan. 2009, 6 pages.

(Continued)

*Primary Examiner* — Arleen M Vazquez
*Assistant Examiner* — Leonard S Liang

(57) ABSTRACT

In one embodiment, a method selects a percentage of a plurality hosts that are coupled together via a network fabric and calculates a number of workloads needed for the percentage of hosts based on a benchmark test to run. A plurality of data compute nodes are configured on one or more host pairs in the percentage of the plurality of hosts to send and receive the number of workloads through the network fabric to perform the benchmark test. A set of measurements is received for sending and receiving the workloads through the network fabric using the plurality of data compute nodes. The method increases the percentage of the plurality of hosts until the set of measurements fails a criteria or the percentage of the plurality of hosts is all of the plurality of hosts.

20 Claims, 9 Drawing Sheets

(51) Int. Cl.
*H04L 47/70* (2022.01)
*H04L 41/12* (2022.01)

(56) References Cited

U.S. PATENT DOCUMENTS

| | | | | |
|---|---|---|---|---|
| 7,383,330 | B2* | 6/2008 | Moran | H04L 41/12 |
| | | | | 709/224 |
| 8,370,496 | B1* | 2/2013 | Marr | H04L 67/1031 |
| | | | | 370/396 |
| 8,392,575 | B1* | 3/2013 | Marr | G06F 9/5061 |
| | | | | 709/226 |
| 8,539,094 | B1* | 9/2013 | Marr | H04L 47/125 |
| | | | | 709/235 |
| 8,745,624 | B2* | 6/2014 | Martin | G06F 9/547 |
| | | | | 718/102 |
| 8,832,498 | B1* | 9/2014 | Jain | G06F 11/079 |
| | | | | 714/26 |
| 9,210,048 | B1* | 12/2015 | Marr | H04L 41/145 |
| 9,876,572 | B2* | 1/2018 | Srinivas | H04B 10/27 |
| 10,015,107 | B2* | 7/2018 | Marr | H04L 49/20 |
| 10,432,638 | B2* | 10/2019 | Nambiar | G06F 9/5061 |
| 2002/0083159 | A1* | 6/2002 | Ward | H04L 49/10 |
| | | | | 709/220 |
| 2003/0144822 | A1* | 7/2003 | Peh | G06F 30/18 |
| | | | | 703/1 |
| 2013/0304903 | A1* | 11/2013 | Mick | H04L 43/0817 |
| | | | | 709/224 |
| 2016/0020993 | A1* | 1/2016 | Wu | H04L 43/028 |
| | | | | 370/392 |
| 2016/0380892 | A1* | 12/2016 | Mahadevan | H04L 45/42 |
| | | | | 370/389 |
| 2017/0185132 | A1* | 6/2017 | Bodas | G06F 11/3433 |
| 2017/0322827 | A1* | 11/2017 | Little | G06T 11/60 |
| 2018/0367371 | A1* | 12/2018 | Nagarajan | H04L 43/0811 |
| 2019/0081852 | A1* | 3/2019 | Nazar | H04L 41/0613 |
| 2019/0182161 | A1* | 6/2019 | Ravi | H04L 47/11 |
| 2019/0312772 | A1* | 10/2019 | Zhao | G06N 3/08 |

OTHER PUBLICATIONS

Jayshree Ullal, "Evolutionary Designs for Cloud Networking", ARISTA blog, Jan. 20, 2009, 6 pages.
Brad Hedlund, "A network that Doesn't Suck for cloud and Big Data: Interop 2012 session teaser", Apr. 30, 2012, 5 pages.
Ivan Pepelnjak, "Data Center Fabrics—What Really Matters", NIL Data Communications, 2012.
"Cisco Data Center Infrastructure 2.5 Design Guide," Cisco Systems, Inc, Nov. 2, 2011, San Jose, CA., 180 pages.
"Introducing data center fabric, the next-generation Facebook data center network," downloaded from https://code.facebook.com/posts/360346274145943/introducing-data-center-fabric-the-next-generation-facebook-data-center-network/, Nov. 2014.
M Alizadeh et al, "On the Data Path Performance of Leaf-Spine Datacenter Fabrics," in Proceedings of 2013 IEEE 21st Annual Symposium on High-Performance Interconnects (HOTI), Aug. 2013, pp. 71-74, San Jose, CA, USA.
Mohammad Al-Fares et al., "A Scalable, Commodity Data Center Network Architecture," in ACM SIGCOMM Computer Communication Review, Oct. 2008.
Mohammad Al-Fares et al., "Hedera: Dynamic Flow Scheduling for Data Center Networks," in Proceedings of the 7th USENIX Conference on Networked Systems Design and Implementation (NSDI), Apr. 2010, pp. 19-19, Berkeley, CA, USA.
Andrew R. Curtis et al., "Mahout: Low-Overhead Datacenter Traffic Management Using End-Host-Based Elephant Detection," in Proceedings of IEEE INFOCOM, Apr. 2011, Shanghai, China.
Spirent Test Center, downloaded from //www.spirent.com/sitecore/content/Home/Ethernet_Testing/Software/TestCenter on Sep. 28, 2017.
IXIA IxNetwork, "Test Architecture", downloaded from www.ixiacom.com/solutions/network-test/data-center-cloud-test on Sep. 28, 2017, 7 pages.
Carlos Pereira, "Application Centric Infrastructure (ACI) Deep Dive", Cisco Live Cancun 2013, Nov. 7, 2013, 80 pages.
A Greenberg et al, "VL2: A Scalable and Flexible Data Center Network," in Proceedings of the ACM SIGCOMM 2009 Conference on Data communication, Aug. 2009, pp. 51-62, New York, NY, USA.
R Jain et al., "A Quantitative Measure of Fairness and Discrimination for Resource Allocation in Shared Systems," DEC Research Report TR-301, Jan. 1998.
Netperf, downloaded Sep. 28, 2017 from http://www.netperf.org/netperf/.
VMware, "VMware and Arista Network Virtualization Reference Design Guide for VMware vSphere Environments," Mar. 15, 2014, 49 pages.
Roger Fortier, "Elephant Flow Mitigation via Virtual-Physical Communication", VMware, Feb. 5, 2014, 10 pages.
Theophilus Benson, "Network Traffic Characteristics of Data Centers in the Wild", IMC'10, Nov. 1-3, 2010, 14 pages, Melbourne, Australia.
Irmen De Jong, "Pyro: Python Remote Objects", downloaded //pythonhosted.org/Pyro/ on Sep. 28, 2017, 1 page.
B. Davie et al., "An Expedited Forwarding PHB (Per-Hop Behavior)", The Internet Society, 2001.
Network Heresy, "Tales of the network reformation—Of Mice and Elephants", Nov. 1, 2013, 7 pages.

* cited by examiner

```
1. FOR percentage IN 5, 10, &, 100:
2.   hostPairs := generateTopology(percentage, topologyType)
3.   hasFailed[] := {FALSE}
4.   FOR test IN "latency"," tput"," ECMP"," perfIsolation" :
5.     results := runTest(test, hostPairs)
6.     IF NOT hasFailed[test] AND results pass criteria[test]:
7.       score[test] := percentage
8.     ELSE:
9.       hasFailed[test] := TRUE
```

FIG. 5

CONTROL OF A COMPUTING SYSTEM TO PERFORM NETWORK FABRIC BENCHMARK MEASUREMENTS

CROSS REFERENCE TO RELATED APPLICATIONS

The present disclosure claims priority to U.S. Provisional App. No. 62/401,004, entitled "DATA CENTER NETWORK FABRIC BENCHMARK", filed Sep. 28, 2016, the contents of which is incorporated herein by reference in its entirety.

BACKGROUND

A network fabric is a network topology in which network nodes interconnect via one or more network switches or routers. Performance is a critical consideration in the design of the network fabric, especially in a data center. There have been many proposals and solutions that help build a data center to better adapt to the evolution of the cloud and big data. However, every solution may be evaluated differently, which makes it hard to compare different network fabric designs.

BRIEF DESCRIPTION OF THE DRAWINGS

FIG. 5 shows an example of pseudo-code according to some embodiments.

DETAILED DESCRIPTION

Figure 1:
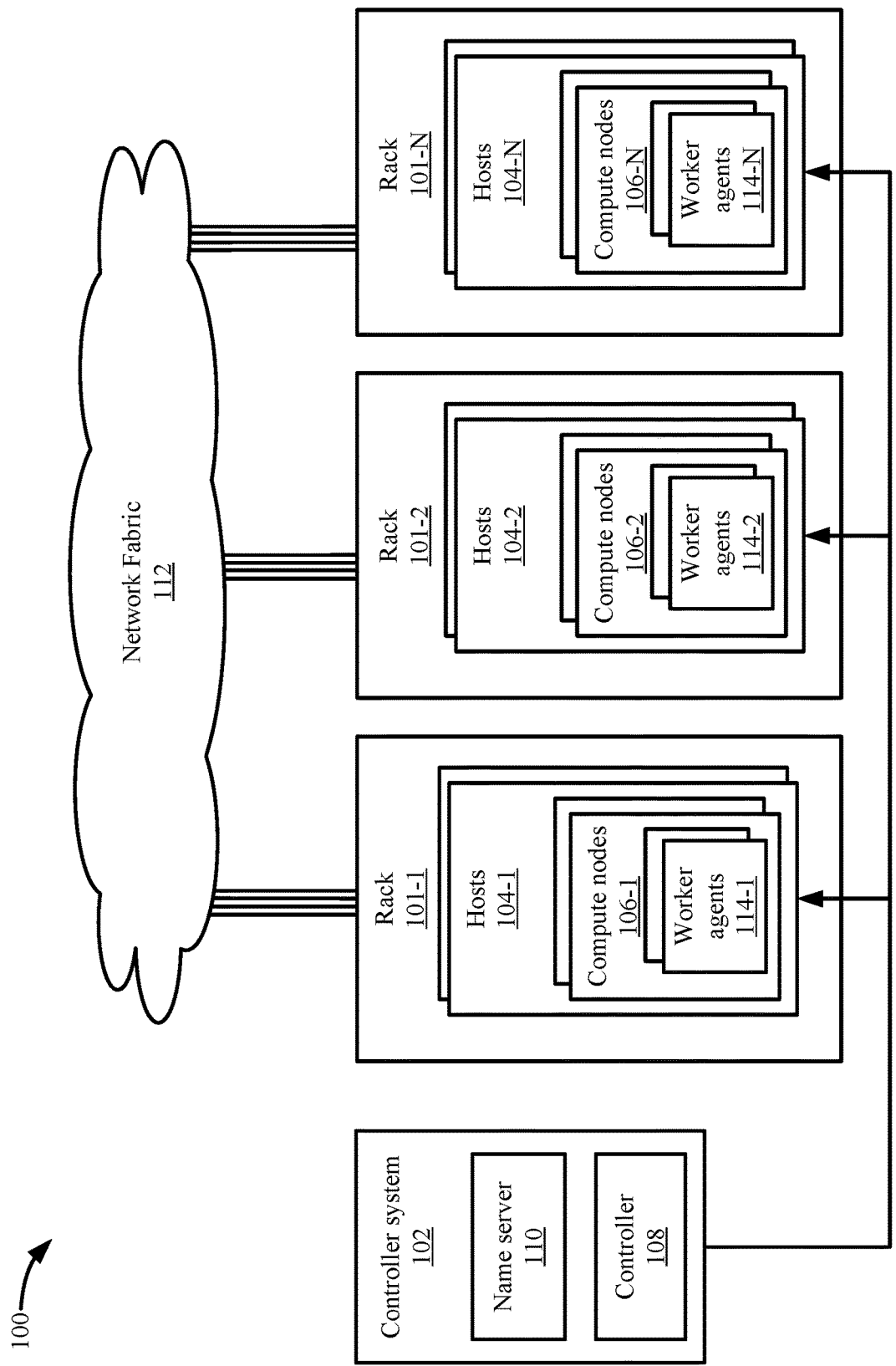
FIG. 1 depicts a simplified system for measuring the performance of network fabric designs using a benchmark according to some embodiments.

In the following description, for purposes of explanation, numerous examples and specific details are set forth in order to provide a thorough understanding of embodiments of the present disclosure. Some embodiments as expressed in the claims may include some or all of the features in these examples, alone or in combination with other features described below, and may further include modifications and equivalents of the features and concepts described herein.

A system may use a set of tests for a benchmark to test the performance of one or more network fabric designs. The use of the benchmark for each different network fabric design allows a user to compare the performance for different network fabrics. The same tests for a benchmark may be run on multiple network fabric designs to generate test scores for the individual tests and/or an overall score. A user can use the scores to compare the performance of the network fabric designs. Network engineers typically design, or consider, several possible network topologies based on their workload profile. However, the engineers may not know which network topology will actually give the best performance because performance can comprise many factors or aspects. The presently described benchmarking system/process allows network engineers to quantify these aspects and thus determine the most representative and critical aspects. The benchmark provides a systematic and quantitative way to measure the performance of network topology by giving scores to the key aspects of a network topology. The performance of different network topologies can be compared intuitively with these scores.

A system includes a controller and a computing system that is coupled to a network fabric. The computing system may include a number of racks that include a number of hosts. Each of the hosts may include a number of data compute nodes, which may be virtual machines, but may also be physical machines. The controller can then calculate a percentage of the hosts to include in the tests initially. The controller configures the percentage of hosts, such as five percent of the hosts, to send and receive network traffic (e.g., workloads) on the network fabric.

The controller receives measurements for the sending and receiving of the workloads through the network fabric for each test. When all tests have been run, the controller determines whether or not any of the tests have failed. For the tests that have failed, the controller removes the tests from further testing. If some tests remain, the controller increases the percentage of the hosts and continues to allocate workloads to the hosts to perform the remaining tests. This process continues until all the tests of the benchmark have failed or the percentage of hosts has reached 100%. The controller then calculates scores for the tests of the benchmark. The above tests may be run on different network fabrics and the scores can be used to compare the network fabric designs in a standardized way. That is, a user can determine how different network fabrics compare performance-wise.

As will be described in more detail below, the controller configures the computing system such that workloads are distributed in a manner that computer processing unit (CPU) resources on hosts do not affect the test for the performance of the network fabric. This is performed because if the performance of a host is affected (e.g., CPU cannot support the network load) because too many workloads are being processed, then the benchmark test of the network fabric may not be accurate.

Overview

FIG. 1 depicts a simplified system 100 for measuring the performance of network fabric designs using a benchmark according to some embodiments. System 100 includes a controller system 102, multiple racks 101-1 to 101-N that include multiple hosts 104-1 to 104-N, and a network fabric 112. Hosts 104 may include multiple data compute nodes 106-1 to 106-N. Although three racks 101-1 to 101-N are shown, it will be understood that many more racks 101, hosts 104, and data compute nodes 106 may be implemented depending on the requirements of the benchmark. Also, although the rack/host system is described, it will be understood that other configurations of a computing system may be appreciated. For example, hosts 104 do not need to be positioned in racks 101.

Controller system 102 may be a separate computing device from hosts 104 or may be situated in one of hosts 104. A controller 108 controls the running of the tests of the benchmark on network fabric 112. In some embodiments, controller 108 is a virtual appliance for directing worker agents 114-1 to 114-N and collecting and aggregating resulting performance data. For example, controller 108 may be a data compute node (e.g., virtual machine) that manages other data compute nodes 106 on host 104. Controller 108 communicates with worker agents 114 in data compute nodes 106 to perform the tests of the benchmark. In some embodiments, each host 104 may have a single worker agent 114 that controls all data compute nodes 106 or each data compute node 106 may include a worker agent 114.

Data compute nodes 106 may be virtual machines, but other forms of network endpoints may be implemented. For example, the network endpoints may be generically referred to as data compute end nodes, containers, or other adjustable nodes. Also, data compute nodes may include non-virtualized physical hosts, virtual machines, containers that run on the top of a host operating system without the need for a hypervisor or separate operating system, and hypervisor kernel network interface modules. In an all-physical topology, each data compute node 106 can be considered as a physical host. A data compute node 106 can send and/or receive network load to and/or from multiple other data compute nodes 106.

Network fabric 112 is a network topology in which data compute nodes 106 of hosts 104 interconnect via one or more network nodes, such as switches or routers. Network fabric 112 may be implemented in different network topologies that use different interconnections or network nodes. In some examples, network fabric 112 may be implemented in a physical network topology, but in other examples, the network topology may be emulated. Using the emulated network topology may allow the network topology to be dynamically changed for testing without having to re-arrange physical components in network fabric 112. Also, the network topology may be the same physically, but different settings may be changed for processing network traffic.

Network fabric 112 may be used for virtual (or "logical overlay") network fabrics where there is an underlying physical fabric and a native (physical) network topology. The virtual network topology may include a plurality of logical network overlays in a network infrastructure paradigm broadly referred to as "software-defined networking" (SDN). Logical layer 2 or layer 3 (in the open systems interconnection model (OSI model)) networks are implemented by an encapsulation step for data compute node-originated and/or data compute node-destined packets being passed between hypervisors of hosts 104, which creates tunnels passing through the physical network layer where the tunnels connect hosts 104 to carry logical overlay traffic. Any of a variety of encapsulation technologies or standards may be used, such as generic network virtualization encapsulation (GENEVE), virtual eXtension local area network (VXLAN), stateless transport tunneling (STT), etc.

Some examples of a network topology for network fabric 112 may include a three-tier topology or a spine/leaf topology. The three-tier topology partitions the network into several sub-trees where the bi-section bandwidth within a sub-tree is likely to be much higher than the bi-section bandwidth across sub-trees. A spine/leaf fabric may have spine switches and top-of-the-rack (ToR) layer 2 leaf switches. The spine/leaf topology is different from the three-tier topology in that the spine/leaf fabric is built on racks with uniform performance such that virtualization technologies can be completely de-coupled from physical configurations.

Some embodiments may test the benchmark on different network topologies and provide standardized scores for each network topology that allows users to compare the performance of the different network fabrics 112. This may allow users to design and consider different network fabrics 112 based on the performance.

To deploy the computing system, data compute nodes 106 may be installed on hosts 104 with worker agents 114. Data compute nodes 106 may register to name server 110. Name server 110 maintains the mapping between logical object names and their physical invocation locations. Each participating host runs one or more instances of a worker agent, which does the following: (1) takes the IP address, network mask, and an optional rack ID of the worker agent as arguments; (2) registers itself to name server 110; and (3) provides RMI (Remote Method Invocation) interfaces so that controller 108 can communicate with the worker agent 114. Then, controller 108 may recognize all of the data compute nodes 106 that are available.

During the testing of the benchmark, controller 108 may not use all of hosts 104 and compute nodes 106 that have been allocated in the computing system. Rather, controller 108 may select a percentage of hosts 104 to perform the benchmark test. To send workloads through network fabric 112, controller 108 selects host pairs. Controller 108 may use different strategies for pairing hosts 104, such as random selection, intra-rack, and inter-rack. The random strategy selects hosts 104 in a purely random or pseudo-random manner. Intra-rack and inter-rack use uniform distribution in host selection either for hosts in the same rack or for hosts in different racks. For inter-rack topology, when choosing a workload sender and its workload receiver (a "host pair"), controller 108 makes sure the hosts span across two racks, based on their rack ID (or subnet ID if rack ID is not specified). For intra-rack topology, controller 108 chooses only host pairs within a rack.

Controller 108 configures a number of workloads to be processed during the tests. As used herein, the term, "workload" refers to units of sending and receiving of network traffic. For example, when workloads are distributed among data compute nodes 106 on hosts 104, "the number of sessions" is used to measure the amount of workload. For example, eight workload sessions may make up a workload. As physical hosts are paired up, controller 108 may configure different paths of the sending workload and a receiving workload that are distributed to data compute nodes 106 on hosts 104. The automatic configuring of data compute nodes improves the process of performing the benchmark tests by allowing a single architecture to be used to perform multiple tests. Controller 108 can perform one test and then configure data compute nodes 106 to perform another test automatically. Worker agents 114 can configure data compute nodes 106 to perform the required workloads upon receiving a communication from controller 108.

Data compute nodes 106 can then perform the workloads and agents 114 and return measurements for the tests to controller 108. Controller 108 may determine whether or not the tests of the benchmark have failed. For example, controller 108 may want to determine at what percentage (e.g., load) does network fabric 112 fail the benchmark. If some of the tests of the benchmark have not failed, then controller 108 may increase the percentage of hosts 104 participating in the benchmark and then run the benchmark again. This process continues until either all of the tests of the benchmark have failed or 100% of hosts 104 have been selected. Increasing the percentage allows the quantification of how scaling the computing system out affects network performance.

The benchmark may include multiple tests that will be described in more detail below. For example, the tests of the benchmark may include a latency uniformity test, a throughput uniformity test, an equal cost multi-path (ECMP) degree of balance test, and a performance isolation test. Although these tests of a benchmark are described, it will be understood that other tests may be used and any number of the tests may be included in a benchmark. The tests of the benchmark quantify three design objectives for a network fabric: (1) performance uniformity for unlimited workload mobility, (2) performance isolation for heterogeneous coexisting workloads, and (3) ability to scale out easily for simpler provisioning and management. This benchmark may scale to data center size (tens or hundreds of thousands of servers) and is extensible (such that mixing or adding new types of workloads requires minimum work). This description includes various embodiments of the benchmark that may contain or include various features they may not be mutually exclusive of one another.

Benchmark Testing Process

Figure 2:
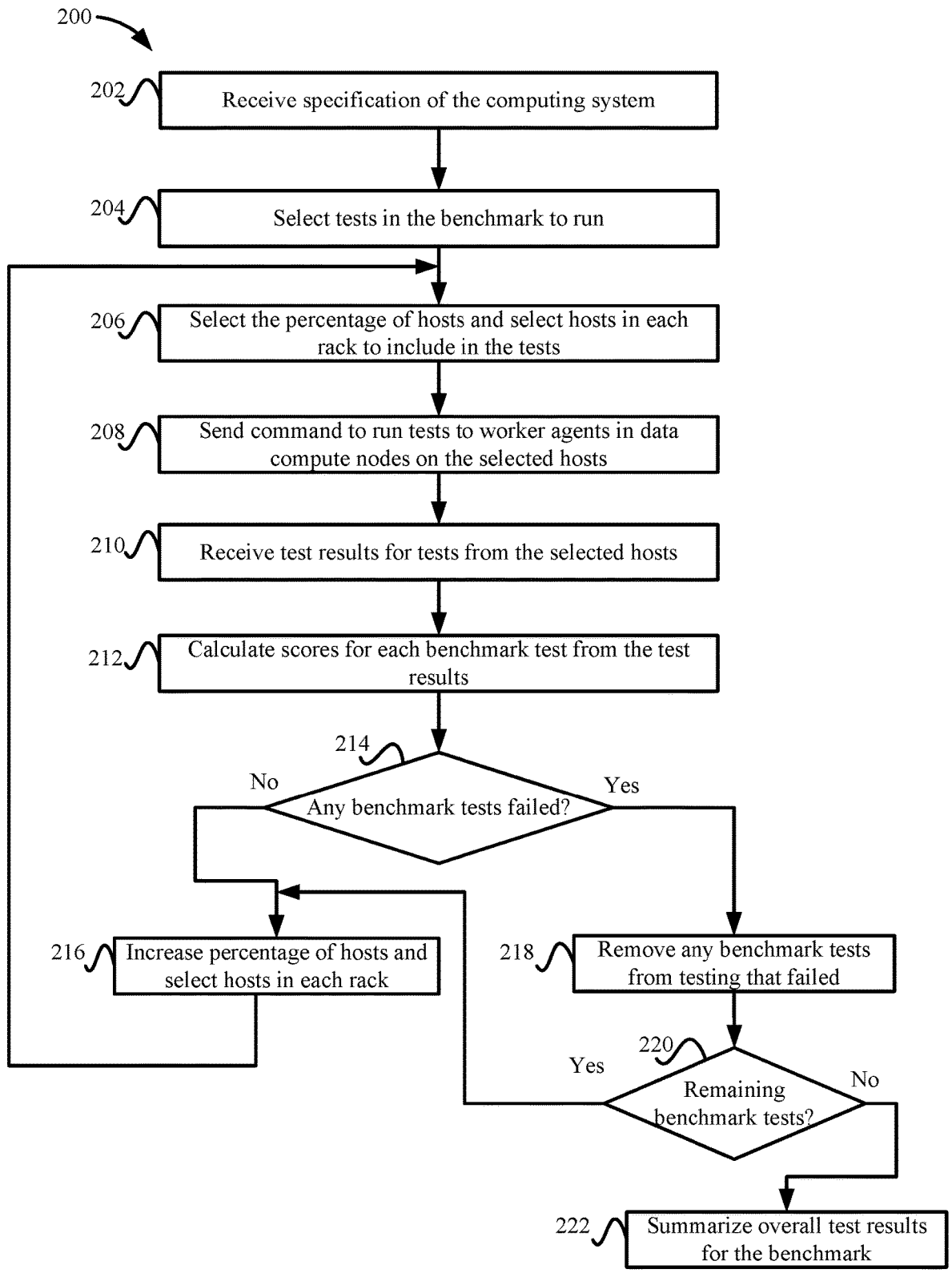
FIG. 2 depicts a simplified flowchart of a method for testing network fabric using the benchmark according to some embodiments.

FIG. 2 depicts a simplified flowchart 200 of a method for testing network fabric 212 using the benchmark according to some embodiments. As discussed above, the benchmark may include multiple tests that can be run on one or more network fabrics 112.

At 202, controller 108 receives a specification of the computing system, such as a number of racks 101, a number of hosts 104 per rack 101, and a number of data compute nodes 106 per host 101. The specification defines the possible resources that controller 108 can configure in the tests. The specification may also define other information about the computing system, such as how many computer processing unit (CPU) cores each host 101 includes, which could be used to determine whether or not CPU resources may become saturated in a test. Also, in some examples, to start a test, controller 108 receives input parameters that include the desired percentage of hosts to start in the test, the desired network fabrics 112, and the desired tests to run.

At 204, controller 108 selects tests in the benchmark to run on a network fabric 112. As described above, the benchmark may include different tests that can be run. For example, all the tests may be run or only a portion of the possible tests may be run for this network topology.

At 206, controller 108 selects a percentage of hosts 104 to participate in the tests and selects hosts 104 in each rack 101 to include in the tests. Given that network fabric 112 is being tested, controller 108 most likely selects hosts 104 in different racks 101 to communicate via network fabric 212. In some examples, controller 108 selects the number of hosts 104 per rack 101 randomly. For example, controller 108 selects 10% of hosts 104 in each rack 101. However, in some embodiments, racks 101 may include a different number of hosts 104 per rack 101 and controller 108 selects a different number of hosts 104 per rack. Also, some percentages may have the same number of hosts 104 per rack, such as if each rack has ten hosts 104, then a percentage of 15% and 20% will both have two hosts per rack. With these percentages, racks 101 may have the same number of hosts, but different hosts may be chosen by controller 108 because the hosts may be selected randomly from each rack. Also, instead of picking a percentage of hosts per rack, controller 108 may select a percentage of hosts in total. Then, controller 108 may select the percentage of hosts per the entire computing system rather than by rack.

At 208, controller 108 sends a command to run the tests of the benchmark to worker agents 114 on the selected hosts. For example, for the hosts that were selected, controller 108 configures worker agents 114 to run each test for the benchmark. This allows the tests to be run on the same hosts that are selected for a percentage, which allows the test results to be standardized since the same hosts are used rather than using different hosts that may communicate differently through network fabric 112.

At 210, controller 108 receives test results for the tests of the benchmark from the selected hosts. For example, worker agents 114 from each host 104 may provide results for the tests. Then, at 212, controller 108 calculates scores for each test from the test results. It will be understood that controller 108 may calculate the scores or another entity could. The scores for the different tests will be described in more detail below.

At 214, controller 108 determines if any of the tests of the benchmark failed. For example, controller 108 may compare the scores for the benchmark tests to one or more thresholds, such as controller 108 may compare each test to a respective threshold for the test. Although a threshold is described, any criteria may be used. If a threshold for the test is violated, then the test fails. As described above, controller 108 keeps performing the tests for the benchmark until the test is failed. At 218, controller 108 removes any of the tests from testing that failed. Then, at 220, controller 108 determines if there are any remaining benchmark tests. If not, at 222, controller 108 summarizes the overall test results for the benchmark. This may include individual scores for each benchmark test and also an overall score for the benchmark that combines the individual scores for the tests. In some embodiments, controller 108 uses the failure point to generate scores for the tests. For example, controller 108 assigns a failure at 20 percent of the hosts a score of "3" and assigns a failure at 80 percent of the hosts a score of "8". Other methods of generating scores may also be used. The overall score may be a combination of the test scores, such as an average of the individual test scores, a median, a maximum, etc.

If there are still remaining benchmark tests that have not failed, then at 216, controller 108 increases the percentage of hosts 104 and selects hosts 104 in each rack. Then, the process reiterates to 206 where controller selects hosts 104 in each rack again as described again and controller 108 runs the tests again. The increase in the percentage of hosts 104 may increase the network traffic on network fabric 112 and the results may be different. This process continues until controller 108 determines that all tests have failed or 100% of the hosts 104 have been selected. The process described in FIG. 2 may be used on different network topologies and the overall score may be used to compare the performance of the different network topologies quickly.

Workload Calculation

Upon calculating the number of hosts per rack, controller 108 calculates the workloads that are required for the tests for the given number of hosts per rack. For each test, there may be a different number of workloads that are required.

Figure 3:
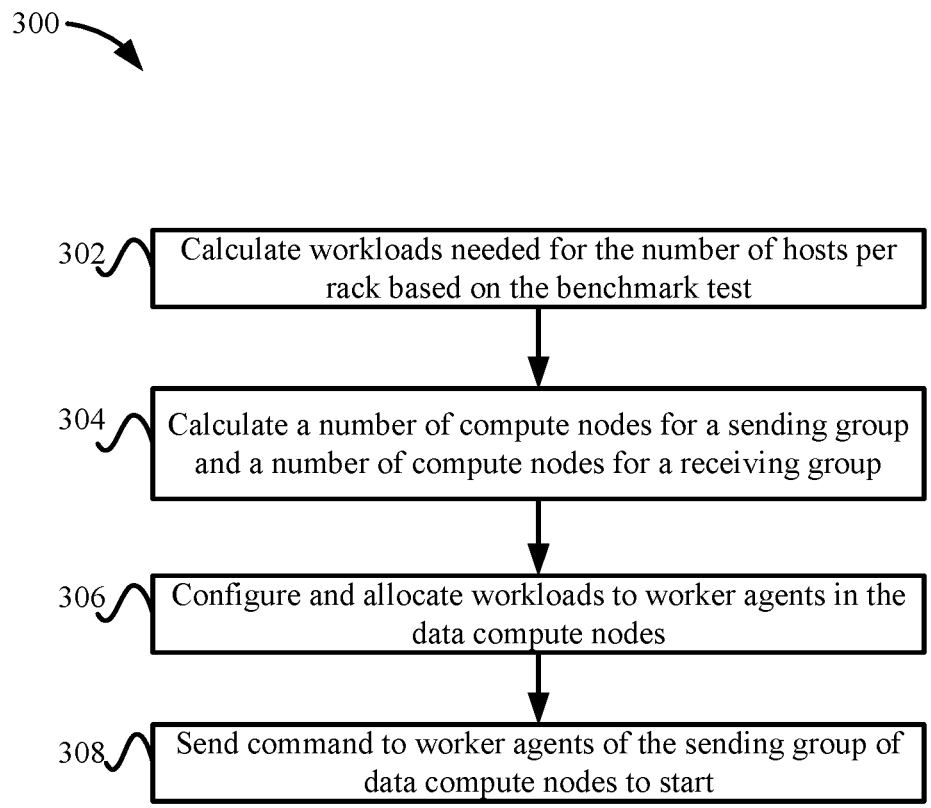
FIG. 3 depicts a simplified flowchart of a method for generating and allocating workloads according to some embodiments.

FIG. 3 depicts a simplified flowchart 300 of a method for generating and allocating workloads according to some embodiments. At 302, controller 108 calculates the workloads needed for the number of hosts per rack based on the tests. For example, for each test, controller 108 selects the number of workloads to ensure an amount or type of network traffic through network fabric 112 is met to ensure the test can be run. For example, controller 108 attempts to select the number of workloads such that the network fabric 112 can be provided with the appropriate amount of traffic with the fewest hosts possible.

Once determining the number of workloads, at 304, controller 108 calculates a number of data compute nodes 106 for a sending group and a number of data compute nodes 106 for a receiving group. For a workload, there may be a sending side and a receiving side. For example, to send a workload over network fabric 112, a first data compute node 106 in a first host 104 needs to generate and send the workload through network fabric 112, and then a second data compute node 106 in a second host 104 needs to receive the workload. In some embodiments, the receiving side uses more computing resources, such as a computing processing unit (CPU) cost, than the sending side. To avoid CPU bottleneck, controller 108 may use more data compute nodes 106 to receive than to send. For example, in each host 104, there may be a ratio, such as a 2:1 ratio of receiving data compute nodes 106 to sending data compute nodes 106. By using more data compute nodes 106 for receiving, then the CPU cost may be spread out more avoiding CPU bottleneck at hosts 104 when multiple CPU cores are included in a host, such as each CPU core is allocated to one or more data compute nodes 106. For example, if there is only one host pair and there are 8 workloads, because bi-directional traffic may be sent, such as from a sending data compute nodes to a receiving data compute node and then back from the receiving data compute node to the sending data compute node on each host 104, there may be one data compute node 106 sending eight workloads and two data compute nodes 106 receiving four workloads. This may spread the receiving data compute nodes across CPUs if there is a 1:1 relationship of CPU to data compute node 106 in hosts 104. Also, controller 108 may add fewer data compute nodes 106 than required, such as controller 108 needs 16 sending data compute nodes 106 and 32 receiving data compute nodes 106 for a test, but host 104 may only be able to run 24 data compute nodes 106 on a host. Thus, controller 108 may partition data compute nodes 106 into sending and receiving groups in a 1:2 ratio and allocate workloads respectively in a round-robin manner. That is, not all workloads may be sent at once by host 104. Rather, only 8 sending data compute nodes 106 and 16 sending data compute nodes 106 may be provisioned on a host pair. In a first period, eight sending workloads are sent and sixteen receiving workloads are processed. Then, in a second period, the second eight sending workloads are sent and the second sixteen receiving workloads are received. It is noted that the number of workloads that are needed and the ratio may be configurable and different for the benchmark tests. For example, different tests in the benchmark may use the same workload assignment above, but with different parameters, such as a different number of workloads, different sending/receiving ratios, and different workload senders.

Once determining the number of sending and receiving data compute nodes 106, at 306, controller 108 configures and allocates workloads to worker agents 114 in data compute nodes 106. For example, controller 108 may send signals to worker agents 114 via an interface to configure data compute nodes 106 as sending or receiving data compute nodes. The signals may also include any instructions on how to generate the workloads (e.g., how many sessions) and also how to send the workloads through network fabric 112.

At 308, controller 108 then sends a command to worker agents 114 of the sending group in the data compute nodes 106 to start the test. For example, data compute nodes 106 then generate the workloads and send the workloads through network fabric 112.

Calculation of Workloads

Figure 4:
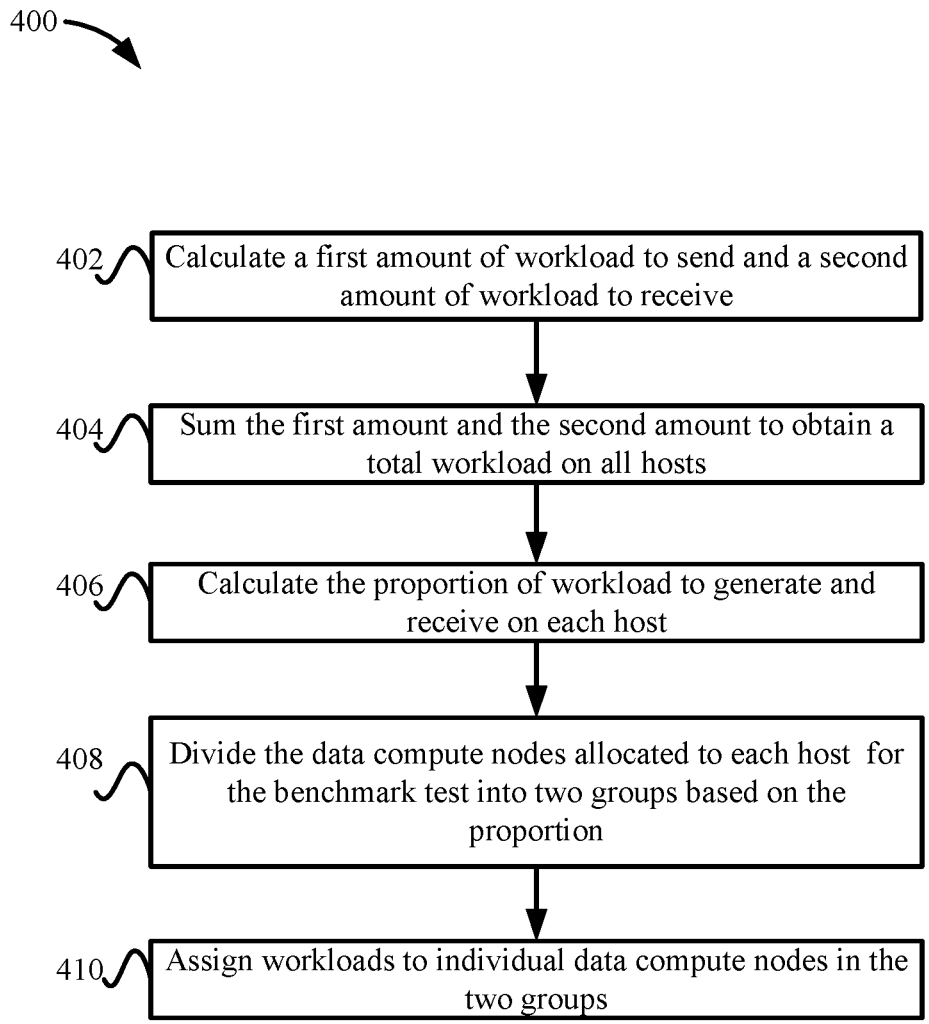
FIG. 4 depicts a simplified flowchart of a method for calculating the sending and receiving workloads according to some embodiments.

As described above, the workloads may be separated into sending and receiving workloads. FIG. 4 depicts a simplified flowchart 400 of a method for calculating the sending and receiving workloads according to some embodiments. At 402, controller 108 calculates a first amount of workload to send and a second amount of workload to receive. Controller 108 calculates the amounts based on the percentage of hosts selected and the specific test being performed. Then, at 404, controller 108 sums the first amount and the second amount to obtain the total workload on all hosts 104. At 406, controller 108 calculates the proportions of workload to send and receive on each host 104. The proportions may be based on the test.

At 408, controller 108 divides the data compute nodes 106 allocated to each host 104 for the benchmark test into one of the sending group of the receiving group based on the proportion. For example, controller 108 allocates 8 sending data compute nodes and 16 receiving data compute nodes. At 410, controller 108 assigns workloads to individual data compute nodes 106 in the sending and receiving groups. For example, controller 108 may signal to worker agents 114 the workload to send a workload or receive a workload based on the test being performed.

Example Pseudo-Code

FIG. 5 shows an example of pseudo-code 500 according to some embodiments. In line 1, the percentage may be incremented in 5% increments to select the percentage of hosts 104 to participate in the benchmark. In line 2, the pairs of hosts 104 to use are selected. Then, in line 3, for the tests in the benchmark that have not failed continue to proceed while test that have failed are removed. In line 4, the four tests are shown as the performance latency (latency), the throughput uniformity (t-put), the ECMP balance test (ECMP), and the performance isolation test (perfIsolation).

In line 5, the results are received for each test and host pair. Then, line 6 tests whether a test has not failed criteria for each test and the results pass the criteria. Line 7 stores the percentage for the test and the test is run again. In lines 8 and 9, when the test has failed, it is noted that the test has failed at the current percentage.

As described above, multiple tests in the benchmark may be used. The following will now describe the latency uniformity test, throughput uniformity test, ECMP test, and the performance isolation test.

Latency Uniformity Test

Latency uniformity measures a level of latency uniformity of communications through network fabric 112. Uniformity may be defined by a fairness function, which defines the fairness of communicating workloads between host pairs. In some embodiments, the latency uniformity may be defined as:

$$\text{fairness}(\{\widetilde{RTT_j^i}\}, i,j=\{\text{hosts}\})$$

where $\{\widetilde{RTT_j^i}\}$ represents the median round trip time between a given host pair $\text{host}_i$ and $\text{host}_j$. The fairness function may output a fairness index based on the roundtrip times. Although this fairness function is described, controller 108 may use different fairness functions.

Figure 6:
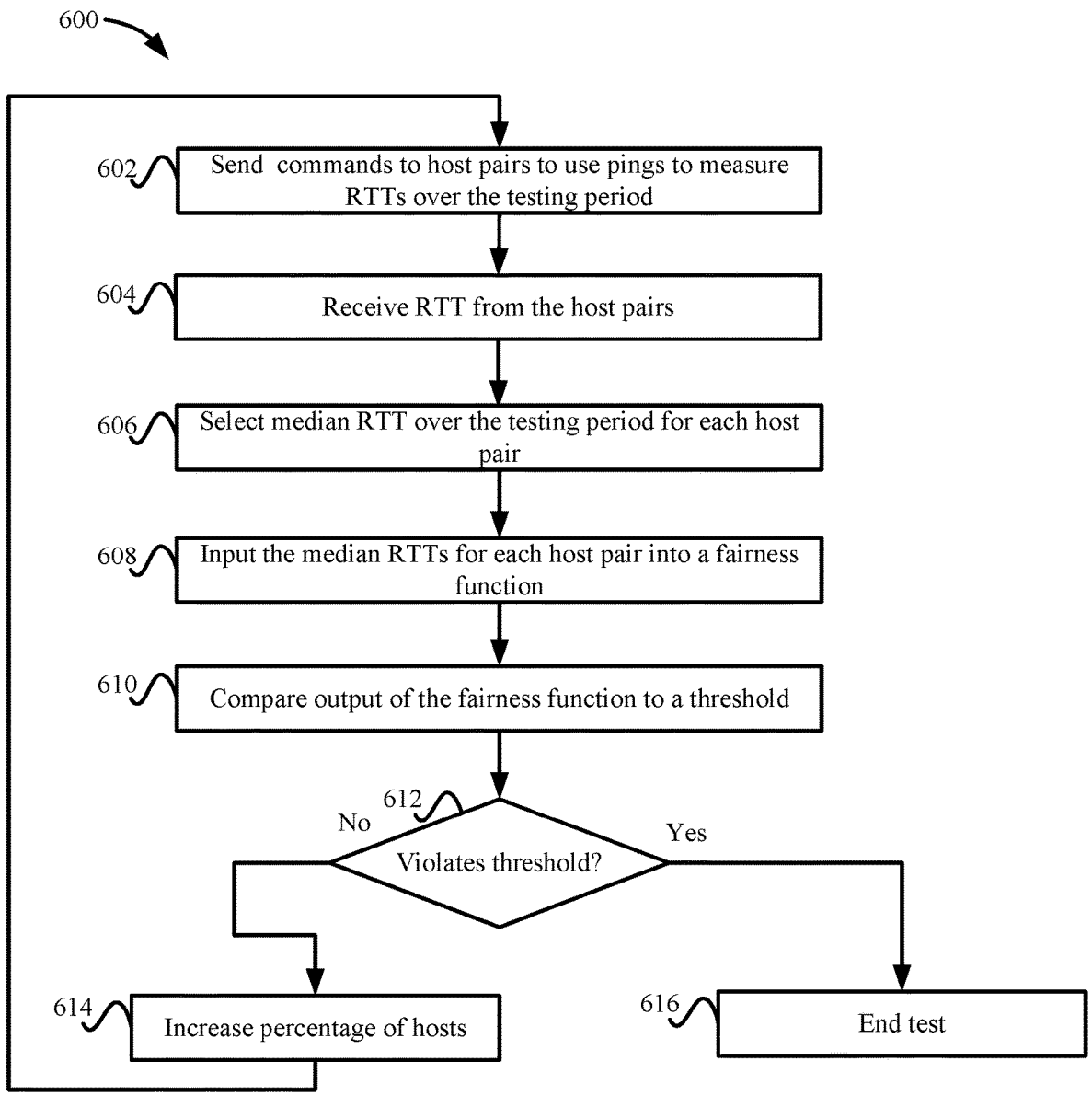
FIG. 6 depicts a simplified flowchart of a method for calculating latency uniformity according to some embodiments.

FIG. 6 depicts a simplified flowchart 600 of a method for calculating latency uniformity according to some embodiments. At 602, controller 108 sends commands to host pairs to use pings to measure the round-trip time (RTT) over a testing period. The ping may be a communication between a sending data compute node 106 and a receiving data compute node 106. Then, that receiving data compute node 106 sends another ping back to the sending data compute node 106. At 604, controller 108 receives the round-trip times from the host pairs.

At 606, controller 108 selects a median round-trip time for the testing period for each host pair. For example, during the testing period, each host pair may have sent multiple pings back and forth to generate multiple round-trip times. Controller 108 selects the median round-trip time to represent the testing period. Although the median is discussed, other representations may be used, such as the average, maximum, minimum, etc.

At 608, controller 108 inputs the median round-trip times for each host pair 104 into the fairness function. The output of the fairness function may be a fractional number between 1/n to 1.0, where n is the number of host pairs that participated. A higher fairness index means the median round-trip times are more clustered and thus more "fair". That is, the round-trip times for the host pairs are more similar. For example, if all host pairs report the exact same round-trip time value, the round-trip times for the host pairs are perfectly fair and the fairness index will be 1.0.

At 610, controller 108 compares the output of the fairness function to a threshold. For example, the threshold may be input by a user. In one example, the output should be greater than or equal to 0.7, but other values can be used. At 612, controller 108 determines if the output violates the threshold. If the output violates the threshold, then at 616, controller 108 ends the test. That is, the test for the benchmark has failed in that the host pairs are not experiencing the desired fairness in latency. If the output does not violate the threshold, at 614, controller 108 increases the percentage of hosts 104 to use in the test.

Although uniformity is described for the latency test, other metrics may be used. For example, some applications may also care about jitter, which is the difference in delay in some workloads. This is because latency jitter may be highly affected by workloads and cross-traffic.

Throughput Uniformity

Figure 7:
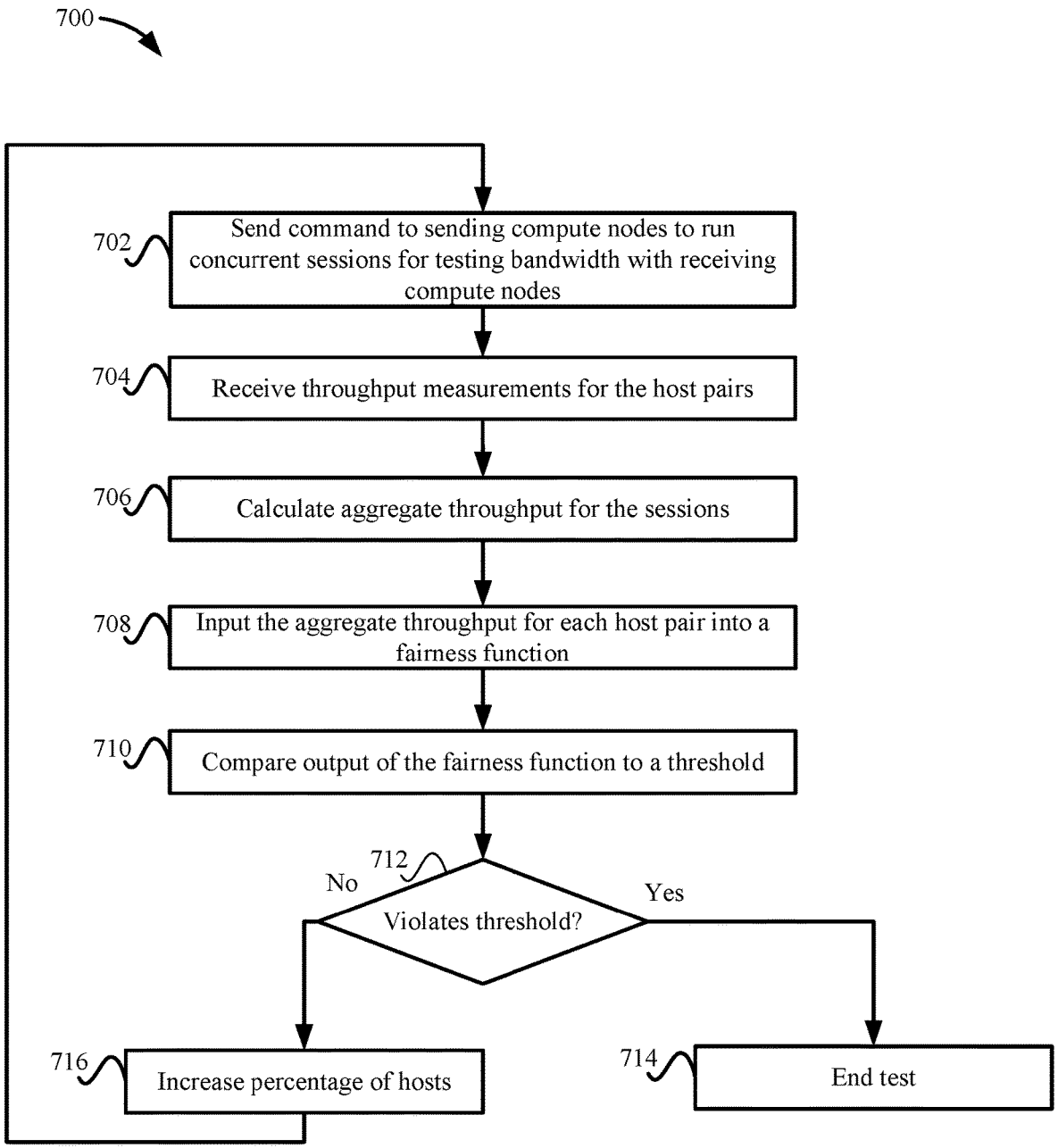
FIG. 7 depicts a simplified flowchart of a method for performing a throughput uniformity test according to some embodiments.

Throughput uniformity may measure the fairness of throughput between host pairs using network fabric 112. FIG. 7 depicts a simplified flowchart 700 of a method for performing a throughput uniformity test according to some embodiments. At 702, controller 108 sends a command to sending data compute nodes 106 to run concurrent workload sessions for testing bandwidth with receiving data compute nodes 106. The sending compute nodes 106 in a sending host 104 may run eight concurrent workload sessions to send a message, such as a 16 KB message, to receiving data compute nodes 106.

At 704, controller 108 receives the throughput measurements for the host pairs. The throughput may measure the network bandwidth between two hosts 104. At 706, controller 108 calculates the aggregate throughput for the workload sessions. For example, the aggregate throughput for all eight workload sessions is calculated.

At 708, controller 108 inputs the aggregate throughput for each host pair into the fairness function. The fairness function may be defined as follows:

fairness($\{throughput_j^i\}$),$i,j=\{hosts\}$, where $throughput_j^i$ represents throughput measured between $host_i$ and $host_j$.

The fairness function may be different fairness functions, such as the same fairness function that is used in the latency test. At 710, controller 108 compares the output of the fairness function to a threshold. Similar to the latency uniformity, if all host pairs report the exact same aggregate throughput, then a fairness score will be 1.0. That is, if the host pairs are experiencing similar throughput, then the fairness score will be higher. In one example, the fairness score must be greater than or equal to 0.7. At 712, controller 108 determines if the fairness score violates the threshold. If the fairness score is below the threshold, then at 714, controller 108 determines that the throughput test has been failed. That is, the host pairs are not experiencing the required fairness in throughput. However, if the fairness is above the threshold, then at 716, controller 108 increases the percentage of hosts 104 used in the test. The process then reiterates to 702 for the test to be performed again with a greater percentage of hosts.

ECMP Degree of Balance

The ECMP measures the balance of traffic across network fabric 112, such as across all active paths. When ECMP is configured, one or more hash algorithms will be used to determine the path chosen for the traffic across network fabric 112. For example, there may be multiple uplinks connected between a leaf switch and all spine switches in a leaf/spine network topology. Depending on the hash value, different uplink paths may then be taken. The quality of the hash algorithm used may largely affect the distribution of network load. ECMP may measure the balance of the distribution.

Figure 8:
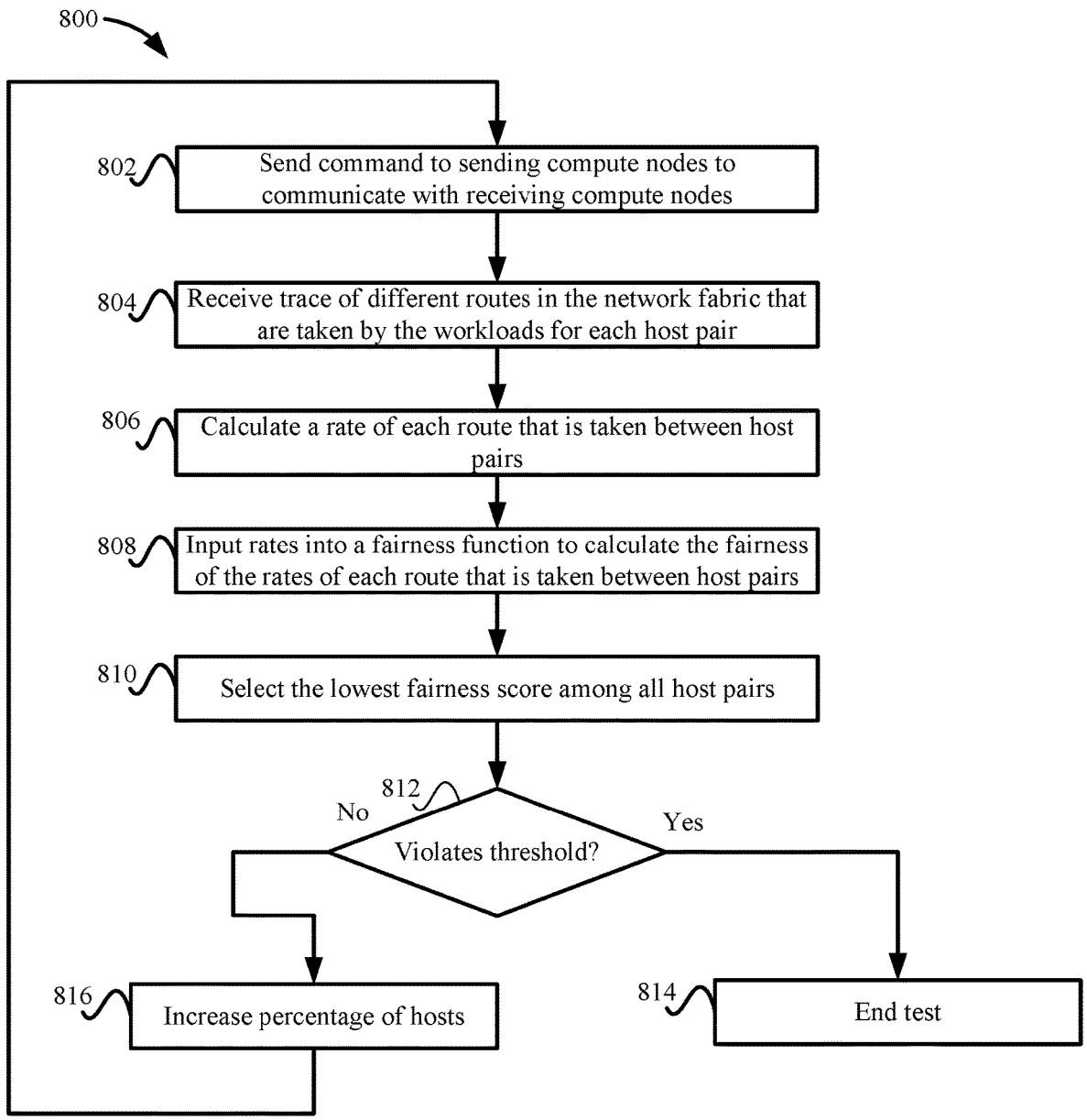
FIG. 8 depicts a simplified flowchart of a method for performing the ECMP degree of balance test according to some embodiments.

FIG. 8 depicts a simplified flowchart 800 of a method for performing the ECMP degree of balance test according to some embodiments. At 802, controller 108 sends a command to sending data compute nodes 106 to communicate with receiving data compute nodes 106. When this occurs, the sending data compute nodes 106 may use a hash algorithm to determine the path for the flow. At 804, controller 108 receives a trace of the different routes in network fabric 112 that were taken by the workloads for each host pair 104. Then, at 806, controller 108 calculates a rate of each route that is taken between host pairs. For example, different routes may be taken and controller 108 calculates the rate that each route is taken in a testing period. The rate may be how many times the route is taken out of the overall number of routes between a host pair.

At 808, controller 108 inputs the rates of each route taken between host pairs into a fairness function to calculate the fairness of the routes. The fairness function may measure the difference between the routes that were taken. For example, if one route is taken a higher number of times than another route, then the fairness between the routes may be lower. If all routes are taken with the same rate, then the fairness is higher.

The following fairness function may be used:

min($\{$fairness($\{rate_j^i\}$),$i,j=\{hosts\}\}$)

In the above equation, $\{rate_j^i\}$ denotes the rate of each route between $host_i$ and $host_j$ being taken during the test period, which may be measured by a traceroute with a series of different transfer control protocol (TCP) ports. The above equation essentially means that controller 108 calculates the fairness score of the rates of being taken for all the routes between a host pair. Then controller 108 uses the lowest fairness score among all participating host pairs as the level of ECMP degree of balance. In other words, if there is a host pair that uses some paths substantially more times than other paths, it will bring down the level of degree of balance even if the other host pairs perfectly distribute traffic across all paths. The lowest score is selected to measure the degree of balance even if other host pairs are perfectly distributing traffic across the paths. Using the lowest score may be helpful to determine if there is a degree of balance issue in network fabric 112.

At 810, controller 108 selects the lowest fairness score among all host pairs. The lowest fairness score is compared to a threshold at 812. The threshold for the ECMP test may be that the fairness score must be greater than or equal to 0.8. If there is only one active path (e.g., there is no ECMP), the score will be omitted. If the fairness score violates the threshold, then the rates between different routes are considered unfair or taken at substantially different rates. At 814, controller 108 ends the test. However, if the lowest fairness score does not violate the threshold, then at 816, controller 108 increases the percentage of hosts and the process reiterates at 802 to perform the test again.

Performance Isolation

Figure 9:
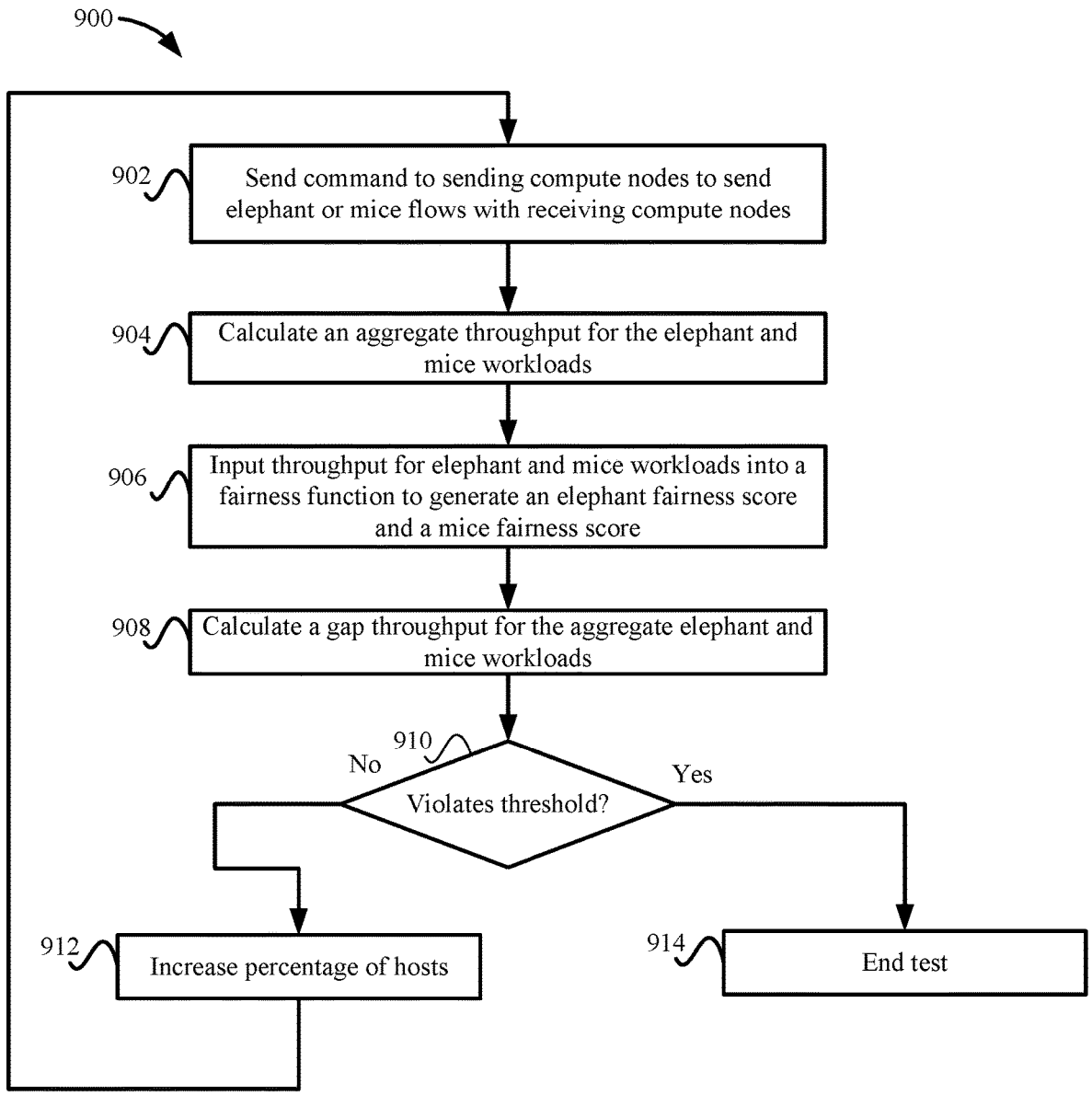
FIG. 9 depicts a simplified flowchart of a method for performing a performance isolation test according to some embodiments.

Performance isolation may measure how heterogeneous co-existing workloads interfere with each other. For example, flows through network fabric 112 may be considered "elephant flows" and "mice flows". Elephant flows may be long-lived flows that carry a large amount of data, such as file transfers; and mice flows may be short-lived flows that carry a relatively small amount of data, such as web requests. FIG. 9 depicts a simplified flowchart 900 of a method for performing a performance isolation test according to some embodiments. At 902, controller 108 sends commands to sending data compute nodes 106 to send either elephant and mice flows with receiving data compute nodes 106. For elephant flows, data compute nodes 106 may use a message size that is streamed to generate long-lived flows, such as a TCP stream with a 16 KB message size. The TCP stream will do a bulk transfer of the message. For mice flows, data compute nodes 106 may use a TCP connect/request/response/receive message flow, such as messages with a 1 KB message size to mimic web request/response behaviors. A TCP connection request and response establishes a TCP session, exchanges 1 KB data between the client and server, tears down the TCP session, and then repeats the same process with a different TCP port. In this way, the TCP traffic will always stay in a slow-start phase and the port numbers will keep changing for every new TCP connection.

In order to show performance improvement when giving mice flows higher priorities, network fabric 112 requires enough of a level of congestion created by elephant flows. The performance isolation test may mix elephant flows and mice flows by a ratio, such as an 80:20 percent elephant:mice flow ratio. Controller 108 may then allocate the proportion of elephant:mice flows to data compute nodes 106 for host pairs.

At 904, controller 108 receives the throughput for elephant and mice workloads and calculates the aggregate throughput for the elephant and mice workloads. Controller 108 may determine the aggregate throughput for each host pair. For the mice throughput, controller 108 may measure the total TCP connection setup rate (e.g., the number of successful connections per second) for every host pair as the throughput. The connection setup rate is used because multiple connections are setup for the mice flows to transfer a small amount of data. For the elephant throughput, controller 108 may measure the aggregate throughput for every participating host pair.

At 906, controller 108 inputs aggregate throughput into a fairness function to generate an elephant fairness score and a mice fairness score. The level of elephant-mice isolation performance may be measured by both fairness and throughput metrics. The fairness metric is defined as follows:

$$\min(\text{fairness}_{elephants}, \text{fairness}_{mice})$$

where:

$$\text{fairness}_{elephants} = \text{fairness}(\text{throughput}_{elephants_j}^i, i, j=\{\text{hosts}\})$$

And $$\text{fairness}_{mice} = \text{fairness}(\text{throughput}_{mice_j}^i, i, j=\{\text{hosts}\})$$

The above determines the minimum (min) of the fairness scores for the elephants and mice flows. The fairness score indicates whether elephant flows and mice flows are both experiencing similar throughput. The fairness of elephant flows is based on the throughput of the host pairs for the elephant flows and the fairness for the mice flows is based on the throughput of the host pairs for the mice flows.

Besides being used in the fairness metric, controller 108 uses the throughput numbers to calculate performance difference in the presence of other background flows and without the presence other background flows, which is considered gap throughput. The fairness considers whether or not the combination of elephant and mice flows is affecting each other. The gap throughput measures how well network fabric 112 can separate the elephant and mice flows. If all elephant flows go to one path and all mice flows go to another path, then the gap is very small. At 908, controller 108 calculates the gap throughput for the elephant and mice workloads. The following functions may be used to calculate the gap throughput:

$$\text{throughput}_{gap\_elephant} = \frac{\text{throughput}_{elephant\_only} - \text{throughput}_{elephant}}{\text{throughput}_{elephant\_only}}$$

$$\text{throughput}_{gap\_mice} = \frac{\text{throughput}_{mice\_only} - \text{throughput}_{mice}}{\text{throughput}_{mice\_only}}$$

The above equation for gap throughput for elephant flows determines a proportion of the throughput of elephant only flows compared with the throughput for elephant flows when combined with mice flows. The elephant only flows are when no other flows exist for that path in network fabric 112. That result of the numerator is divided by the throughput of the elephant only flows to determine the gap throughput. Controller 108 performs the same calculation for mice flows to determine the proportion of mice only flows and mice flows with other elephant flows present. The gap throughput for elephants and the gap throughput for mice are the normalized throughput difference in the presence of other background flows. Mice flows may rarely contribute to more than 3% of the total throughput, but in some cases, the gap between mice only and heterogeneous mice and elephant flows can go well over 50%. Therefore, the above functions determine under heterogeneous traffic whether network fabric 112 has lost too much available capacity either due to poor performing elephant flows or poor performing mice flows.

At 910, controller 108 determines if the fairness function or gap throughput violates one or more thresholds. The threshold for the performance isolation test may be the fairness must be greater than or equal to 0.7 and for the gap throughput, for elephants must be less than 0.2 and the gap throughput for mice must be less than 0.7. The gap between mice only and mice heterogeneous flows, may be larger than the elephant flow gap because mice flows may be typically overwhelmed by elephant flows. However, the gap between elephant only and elephant heterogeneous flows should not be that large because elephant flows should be similar because mice flows are very small, if a threshold is violated for one of the tests, then at 914, controller 108 ends the test. If the threshold is not violated, then at 912, controller 108 increases the percentage of hosts 104 and the process reiterates to 902 to perform the test again. If only one of the fairness or gap test fails, then the other test that did not fail will continue to be tested.

Overall Scores

Scores for the test of the benchmark may be determined based upon the percentage of hosts 104 at which the test fails. For example, if the performance isolation test fails at a 25% load of hosts 104, then the score may be 20. However, if the test fails at 75% load, then the score may be 70. The scores for all the tests may be normalized such that controller 108 can generate an overall score. For example, all the scores for the tests may be added together and/or averaged to generate an overall score. Then, a user can use the scores for different network topologies to determine which network topology works the best for their workloads. For example, users may analyze the scores for individual tests or the overall score to determine which network topology to use.

For each test, controller 108 can test different network topologies. Then, controller 108 can determine the effect of the changes in the network topology has on the score. For example, if a feature in the network is changed, such as differentiated services code point (DSCP) is set in one test and not set in another test, controller 108 can note the change in performance that occurs when the feature is used and not used. The user can then determine whether or not to use the feature in network fabric 212.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

Some embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

What is claimed is:

1. A method comprising:
   selecting, by a computing device, a percentage of a plurality hosts that are coupled together via a network fabric;

calculating, by the computing device, a number of workloads needed for the percentage of the plurality of hosts based on a plurality of benchmark tests to run;

communicating, by the computing device, with a plurality of data compute nodes on one or more host pairs in the percentage of the plurality of hosts to cause configuration of the plurality of data compute nodes to send or receive the number of workloads through the network fabric to perform the plurality of benchmark tests;

receiving, by the computing device, a set of measurements for sending and receiving the workloads through the network fabric using the plurality of data compute nodes;

removing, by the computing device, a first benchmark test in the plurality of benchmark tests that fails a respective criteria for the first benchmark test; and increasing, by the computing device, the percentage of the plurality of hosts and communicating with a new plurality of data compute nodes in the increased percentage of the plurality of hosts to cause configuration of the new plurality of data compute nodes to re-perform a second benchmark test in the plurality of benchmark tests until a set of measurements fails a respective criteria for the second benchmark test or the percentage of the plurality of hosts is all of the plurality of hosts.

2. The method of claim 1, further comprising:

calculating a first number of generating data compute nodes to send workloads through the network fabric and a second number of receiving data compute nodes to receive the workloads through the network fabric based on the percentage of the plurality of hosts, wherein the second number of receiving data compute nodes is larger than the first number of generating data compute nodes.

3. The method of claim 1, wherein configuring the plurality of data compute nodes comprises:

communicating with one or more worker agents on each of the percentage of the plurality of hosts to configure data compute nodes to either send the number of workloads or receive the number of workloads.

4. The method of claim 1, wherein receiving the set of measurements comprises:

receiving round trip times from the sending and receiving of the number of workloads through the network fabric;

selecting a roundtrip time for each of the one or more host pairs;

inputting the roundtrip time for each of the one or more host pairs into a fairness function to generate a score;

comparing the score of the fairness function to the criteria; and increasing the percentage of the plurality of hosts when the score passes the criteria or considering the test failed when the score fails the criteria.

5. The method of claim 1, further comprising:

receiving throughput measurements from the sending and receiving of the number of workloads through the network fabric;

calculating aggregate throughput for each of the one or more host pairs;

inputting the aggregate throughput for each of the one or more host pairs into a fairness function to generate a score;

comparing the score of the fairness function to the criteria; and increasing the percentage of the plurality of hosts when the score passes the criteria or considering the test failed when the score fails the criteria.

6. The method of claim 1, further comprising:

receiving a trace of routes through the network fabric from the sending and receiving of the number of workloads;

calculating a rate of each route for each of the one or more host pairs;

inputting the rate of each route for each of the one or more host pairs into a fairness function to generate a score;

comparing the score of the fairness function to the criteria; and increasing the percentage of the plurality of hosts when the score passes the criteria or considering the test failed when the score fails the criteria.

7. The method of claim 1, further comprising:

receiving throughput measurements from the sending and receiving of a first type of flow and a second type of flow through the network fabric from the number of workloads;

calculating aggregate throughput for the first type of flow and the second type of flow for each of the one or more host pairs;

inputting the aggregate throughput for the first type of flow for each of the one or more host pairs into a fairness function to generate a first score and inputting the aggregate throughput for the second type of flow for each of the one or more host pairs into the fairness function to generate a second score;

comparing the first score and the second score of the fairness function to the criteria; and increasing the percentage of the plurality of hosts when the first score and the second score passes the criteria or considering the test failed when the first score or the second score fails the criteria.

8. A non-transitory computer-readable storage medium containing instructions, that when executed, control a computer system to be configured for:

selecting a percentage of a plurality of hosts that are coupled together via a network fabric;

calculating a number of workloads needed for the percentage of the plurality of hosts based on a plurality of benchmark tests to run;

communicating with a plurality of data compute nodes on one or more host pairs in the percentage of the plurality of hosts to cause configuration of the plurality of data compute nodes to send or receive the number of workloads through the network fabric to perform the plurality of benchmark tests;

receiving a set of measurements for sending and receiving the workloads through the network fabric using the plurality of data compute nodes;

removing a first benchmark test in the plurality of benchmark tests that fails a respective criteria for the first benchmark test; and increasing the percentage of the plurality of hosts and communicating with a new plurality of data compute nodes in the increased percentage of the plurality of hosts to cause configuration of the new plurality of data compute nodes to re-perform a second benchmark test in the plurality of benchmark tests until a set of measurements fails a respective criteria for the second benchmark test or the percentage of the plurality of hosts is all of the plurality of hosts.

9. The non-transitory computer-readable storage medium of claim 8, further configured for:

calculating a first number of generating data compute nodes to send workloads through the network fabric and a second number of receiving data compute nodes to receive the workloads through the network fabric based on the percentage of the plurality of hosts, wherein the second number of receiving data compute nodes is larger than the first number of generating data compute nodes.

10. The non-transitory computer-readable storage medium of claim 8, wherein configuring the plurality of data compute nodes comprises:
communicating with one or more worker agents on each of the percentage of the plurality of hosts to configure data compute nodes to either send the number of workloads or receive the number of workloads.

11. The non-transitory computer-readable storage medium of claim 8, wherein receiving the set of measurements comprises:
receiving round trip times from the sending and receiving of the number of workloads through the network fabric;
selecting a roundtrip time for each of the one or more host pairs;
inputting the roundtrip time for each of the one or more host pairs into a fairness function to generate a score;
comparing the score of the fairness function to the criteria; and
increasing the percentage of the plurality of hosts when the score passes the criteria or considering the test failed when the score fails the criteria.

12. The non-transitory computer-readable storage medium of claim 8, further configured for:
receiving throughput measurements from the sending and receiving of the number of workloads through the network fabric;
calculating aggregate throughput for each of the one or more host pairs;
inputting the aggregate throughput for each of the one or more host pairs into a fairness function to generate a score;
comparing the score of the fairness function to the criteria; and
increasing the percentage of the plurality of hosts when the score passes the criteria or considering the test failed when the score fails the criteria.

13. The non-transitory computer-readable storage medium of claim 8, further configured for:
receiving a trace of routes through the network fabric from the sending and receiving of the number of workloads;
calculating a rate of each route for each of the one or more host pairs;
inputting the rate of each route for each of the one or more host pairs into a fairness function to generate a score;
comparing the score of the fairness function to the criteria; and
increasing the percentage of the plurality of hosts when the score passes the criteria or considering the test failed when the score fails the criteria.

14. The non-transitory computer-readable storage medium of claim 8, further configured for:
receiving throughput measurements from the sending and receiving of a first type of flow and a second type of flow through the network fabric from the number of workloads;
calculating aggregate throughput for the first type of flow and the second type of flow for each of the one or more host pairs;
inputting the aggregate throughput for the first type of flow for each of the one or more host pairs into a fairness function to generate a first score and inputting the aggregate throughput for the second type of flow for each of the one or more host pairs into the fairness function to generate a second score;
comparing the first score and the second score of the fairness function to the criteria; and
increasing the percentage of the plurality of hosts when the first score and the second score passes the criteria or considering the test failed when the first score or the second score fails the criteria.

15. A method comprising:
communicating, by a computing device, with a plurality of data compute nodes on one or more host pairs to configure the plurality of data compute nodes to communicate together via a network fabric to send or receive a number of workloads to perform a benchmark test, wherein the plurality of data compute nodes are configured to send or receive a first type of flow and a second type of flow in the number of workloads;
receiving, by the computing device, throughput measurements from the sending and receiving of the first type of flow and the second type of flow through the network fabric from the number of workloads;
calculating, by the computing device, a first throughput measurement for paths in which only the first type of flow were present, a second throughput measurement for paths in which only the second type of flow were present, and a third throughput measurement in which both the first type of flow and the second type of flow were present; and
calculating, by the computing device, for a first test, a first gap throughput for the first type of flow based on the first throughput measurement and the third throughput measurement and a second gap throughput for the second type of flow based on the second throughput measurement and the third throughput measurement, wherein the first gap throughput measures a first throughput difference between paths in which only the first type of flow were present and paths in which both the first type of flow and the second type of flow were present and the second gap throughput measures a second throughput difference between paths in which only the first type of flow were present and paths in which both the first type of flow and the second type of flow were present;
calculating, by the computing device, for a second test, a first fairness score for the first type of flow based on the first throughput measurement and calculating a second fairness score for the second type of flow based on the second throughput measurement, wherein the first fairness score and the second fairness score measure a fairness of communicating between host pairs;
removing, by the computing device, one of the first test and the second test that fails a respective criteria; and
increasing, by the computing device, a percentage of the plurality of hosts and communicating with a new plurality of data compute nodes in the increased percentage of the plurality of hosts to cause configuration of the new plurality of data compute nodes to re-perform one of the first test and the second test until a respective criteria is failed or the percentage of the plurality of hosts is all of the plurality of hosts.

16. The method of claim 15, further comprising:
selecting a percentage of a plurality of hosts that are coupled together via the network fabric;

comparing the first gap throughput for the first type of flow to a first threshold;

comparing the second gap throughput for the first type of flow to a second threshold; and increasing the percentage of the plurality of hosts when the first gap throughput or the second gap throughput passes the respective criteria or considering the first test failed when the first gap throughput or the second gap throughput fails the criteria.

17. The method of claim 15, wherein the first type of flow transfers more data for a longer period of time for a workload compared to a workload for the second type of flow.

18. The method of claim 15, wherein: the first gap throughput for the first type of flow is calculated by subtracting the third throughput measurement from the first throughput measurement to generate a first difference and dividing the first difference by the third throughput measurement, and the second gap throughput for the second type of flow is calculated by subtracting the third throughput measurement from the second throughput measurement to generate a second difference and dividing the second difference by the third throughput measurement.

19. The method of claim 15, wherein calculating the first fairness score and calculating the second fairness score comprises:

calculating a first aggregate throughput for the first type of flow and a second aggregate throughput for the second type of flow for each of one or more host pairs;

inputting the first aggregate throughput for the first type of flow for each of the one or more host pairs into a fairness function to generate a first score and inputting the second aggregate throughput for the second type of flow for each of the one or more host pairs into the fairness function to generate a second score;

comparing the first score and the second score of the fairness function to the respective criteria; and increasing the percentage of the one or more hosts when the first score and the second score passes the respective criteria or considering the test failed when the first score and the second score fails at least one of the first or second thresholds.

20. The method of claim 15, wherein the first type of flow is a continuous stream of data that is transferred and the second type of flow is a connection that is setup and torn down.

* * * * *